(12) United States Patent
Premaratne et al.

(10) Patent No.: US 6,771,873 B2
(45) Date of Patent: Aug. 3, 2004

(54) OPTICAL LINK SYNTHESIS SYSTEM

(75) Inventors: Dissanayake M. Premaratne, Victoria (AU); Peter J. Feder, Victoria (AU); Julian N. Walford, Victoria (AU); Rudolf Moosburger, Victoria (AU)

(73) Assignee: VPISystems, Victoria (AU)

( * ) Notice: Subject to any disclaimer, the term of this patent is extended or adjusted under 35 U.S.C. 154(b) by 263 days.

(21) Appl. No.: 10/097,176

(22) Filed: Mar. 11, 2002

(65) Prior Publication Data

US 2003/0169998 A1 Sep. 11, 2003

(51) Int. Cl.⁷ .................................................. G02B 6/00
(52) U.S. Cl. ....................................................... 385/147
(58) Field of Search ........................................ 385/147

(56) References Cited

PUBLICATIONS

"A Time–Domain Optical Transmission System Simulation Package Accounting for Nonlinear and Polarization–Related Effects Fiber", Carena et al, IEEE Journal on Selected Areas in Communications, vol. 15, No. 4, May 1997, pp. 751–765.*

"Multiple Signal Representation Simulation of Photonic Devices, Systems, and Networks", Lowery et al, IEEE Journal of Selected Topics in Quantum Electronics, vol. 6, No. 2, Mar./Apr. 2000, pp. 282–296.*

"Behavioral Modeling for Hierarchical Simulation of Optronic Systems", Gaffiot et al, IEEE Transactions on Circuits and System–II: Analog and Digital Signal Processing, vol. 46, No. 10, Oct. 1999, pp. 1316–1321.*

"Modeling and Simulation of OFDCS's", Dai et al, 1997 Asia Pacific Microwave Conference, pp. 577–580.*

"Simulation of Optical Models in Lightwave Links Using SPW", Zheng et al, International Conference on Communication Technology, ICCT'98, S15–07, pp. 1–5.*

"Issues in the Modeling of Fiber Optic Systems", Conforti et al, IEEE IMOC'95 proceedings, pp. 175–182.*

"A Statistical Design Approach for Gigabit–Rate Fiber Optic Transmission Systems", Moaveni et al, Journal of Lightwave Technology, vol. 8, No. 7, Jul. 1990, pp. 1064–1072.*

"Modeling of Transoceanic Fiber–Optic WDM Communication Systems", Golavchenko et al, IEEE Journal of Selected Topics in Quantum Electronics, vol. 6, No. 2, Mar./Apr. 2000, pp. 337–347.*

* cited by examiner

Primary Examiner—John D. Lee
Assistant Examiner—Scott Alan Knauss
(74) Attorney, Agent, or Firm—Foley & Lardner LLP

(57) ABSTRACT

A method of optimising the componentry of an optical data transmission link, the link comprising a series of optical components interconnected by a fiber network, the method comprising the steps of: (a) calculating an equivalent fiber representation for the link; (b) utilising an optimisation algorithm to eliminate redundant optical components from the link; (c) utilising an optimisation algorithm to determine the input channel power of the link.

34 Claims, 3 Drawing Sheets

OPTICAL LINK SYNTHESIS SYSTEM

FIELD OF THE INVENTION

The present invention relates to the creation of optical networks and, in particular, discloses various algorithms to optimise the placement of optical elements within a network.

BACKGROUND OF THE INVENTION

Recently, the construction of optical networks has become more and more significant for forming the basis for data transmission. Optical fibers have been found to have higher and higher levels of useable capacity and hence they are beginning to dominate the area of long haul data transmission.

The design of an optical fiber network is often an extremely complex process. The layout often includes very complex components that must be placed at certain geographical locations so as to meet overall performance requirements. Often, it is desirable to minimise the number of components in a network so that over engineering is avoided.

As the creation of an optical network can be an extremely complex and expensive process, there has risen a general need for the accurate simulation of optical networks utilizing software based systems. Simulations allow a network design to be "trialed" in a virtual environment, which is much faster and less expensive that constructing an experimental prototype, laboratory or field trial system. However, while simulation is a very cost effective method to verify an existing design, by itself simulation does not filly address the overall problem of system synthesis.

Currently, the initial design (or synthesis) of an optical transmission system is a complex task that is best carried out via the intensive attention of an expert human designer. It is highly desirable to be able to capture equivalent expertise within a software synthesis system, to enable optical transmission systems to be preferably designed by people lacking such high levels of expertise.

The process of synthesis involves taking an initial set of design constraints and objectives, and generating a system design using equipment selected from a specified range of suitable, commercially-available components. The design constraints typically include such factors as existing installed fiber plant and geographical facility locations that must be used. The design objectives typically consist of overall performance and cost requirements.

Such a software synthesis system allows for complex planning to be undertaken, including the testing of multiple alternatives without having to place or alter complex and expensive structures in the field.

SUMMARY OF THE INVENTION

It is an object of the present invention to provide for an improved form of optical network synthesis and planning.

In accordance with a first aspect of the present invention there is provided a method of calculating an equivalent fiber representation of a multiplicity of actual fibers, the method comprising the steps of successively combining the parameters of an initial pair of adjacent fibers to compute the parameters of a third fiber that has substantially the same transmission properties as the two original fibers, and wherein one of the initial fibers may itself be an equivalent fiber representation. Alternatively, the method may comprise the step of combining the parameters of a multiplicity of fibers, comprising an arbitrary combination of actual fibers and equivalent fiber representations, to compute the parameters of a single replacement fiber that has the same transmission properties as the multiplicity of fibers.

In accordance with a second aspect of the present invention, there is provided a method for optimizing the topology of an optical data transmission link, the link comprising a series of optical components interconnected by fiber sections, the method comprising the steps of:

a) calculating an equivalent fiber representation of the link;

b) eliminating redundant optical components from the link;

Preferably the method also contains the step of:

c) generating solutions utilizing components selected from a set of available devices;

Preferably the method also contains the step of:

d) utilising an optimisation procedure to determine the input channel power of the link.

The step (a) preferably can comprise the steps of: (a1) progressively joining segments together between facilities and determining whether an equivalent fiber representation for the joined segment falls within predetermined constraints; (a2) progressively joining segments together across facility locations and determining whether an equivalent fiber representation for the joined segment falls within predetermined constraints.

The step (b) can comprise the steps of: (b1) calculating a measure of the signal quality required at the receiver to satisfy the link performance criteria; (b2) calculating the maximum acceptable transmission power for said link; (b3) determining suitable configuration values for predetermined components in the link. The configuration values can, for example, include the amplification factor of an optical amplifier, and the total dispersion of a dispersion compensating module.

The step (b1) can further comprise the step of calculating a numerical measure of signal quality corresponding to a specified link performance. The measure of link performance can, for example, be the probability of transmission errors occurring on the link. The numerical measure of signal quality can be, for example, the Q-factor. The step (b1) can also comprise the step of adjusting this signal quality measure to account for additional sources of degradation in transmission. The additional sources of degradation can be, for example, nonlinear transmission processes such as four-wave mixing. The step (b1) can further comprise the step of calculating a simplified measure of signal quality at the receiver that is more easily optimised in the subsequent steps. The simplified measure of signal quality can be, for example, the optical signal-to-noise ratio (OSNR).

The step (b2) can further comprise the step of calculating the maximum transmission power that will not result in unacceptable signal degradation due to nonlinear transmission effects and additive noise. The nonlinear transmission effects considered can include, for example, four-wave mixing and stimulated Raman scattering. The additive noise considered can be, for example, amplified spontaneous emission noise introduced in optical amplifiers. The step (b2) can further comprise the step of verifying that the output power is valid, within the operating ranges of components in the link. This can include, for example, verifying that the transmitters are capable of generating the required output power.

The step (b3) preferably includes the step of determining the amount of residual dispersion required to optimise the signal quality at the receiver, considering the impact of nonlinear propagation effects. The nonlinear propagation effects can be, for example, the self phase modulation of each transmitted channel. The step (b3) preferably further includes the step of applying dispersion compensation to achieve the required residual dispersion by selecting from available dispersion compensating modules. The available dispersion compensating modules can include, for example, lengths of dispersion compensating fiber. The step (b3) can also include the step of compensating for the insertion loss of the dispersion compensating modules by including further optical amplifying units in the link.

The step (c) preferably includes the step of: (c1) replacing generic components generated in the previous steps with actual components selected from available devices. The generic components to be replaced include, for example, the optical amplifying units placed in the link. The step (c) preferably further includes the step of generating multiple solutions using the available devices, that can be ranked according to additional criteria. The additional criteria can be, for example, the total cost of the link. The step (c) can also include the step of determining the powers of all signal channels at the receiver, and inserting a receiver preamplifier if required to make the signals compatible with the receiver. The requirements for compatibility can include, for example, sufficient received power and sufficient received signal-to-noise ratio.

The step (d) preferably can include the step of optimising the pre-amplification gain and input channel power for the link. Further, this can include the step of: equalising the powers of input channels to obtain a substantially flat spectrum across the transmission bandwidth.

BRIEF DESCRIPTION OF THE DRAWINGS

Preferred and other embodiments of the present invention will now be described with reference to the accompanying drawings in which.

DETAILED DESCRIPTION OF THE PREFERRED AND OTHER EMBODIMENTS

Figure 1:
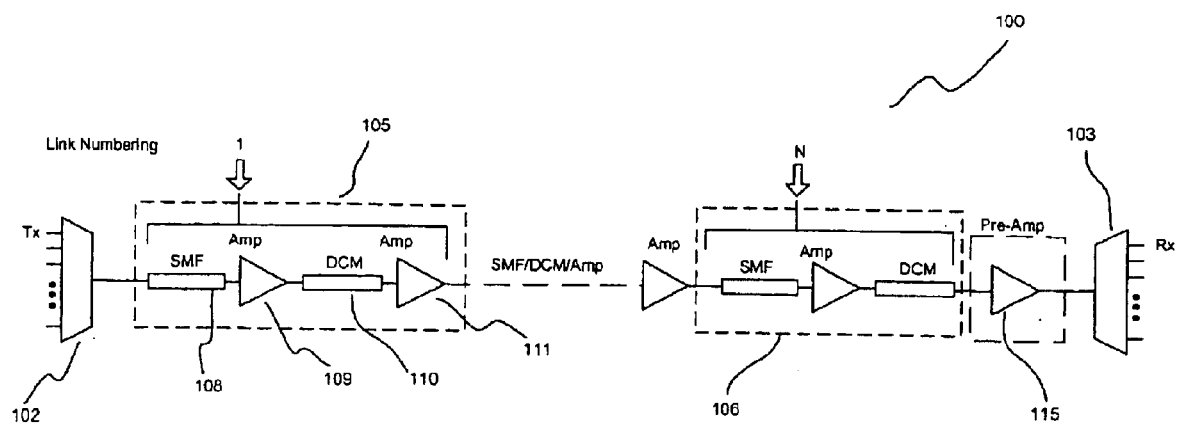
FIG. 1 illustrates schematically an example optical link that can be synthesized with the embodiment of the present invention.

In the preferred embodiment, there is disclosed a series of algorithms for determining the layout of optical components within an optical transmission link.

Initially, the embodiments will be discussed with reference to an example system of an optical link. In the example case, it is desired to form an optical link carrying multiple wavelength channels between two communication points and having a low dispersion. This kind of link is often known as an Optical Multiplex Section (OMS). A schematic illustration of the link is shown 100 in FIG. 1. A series of channels are input multiplexed 102 at one end of the link and are de-multiplexed 103 at the other end. The link includes a number of sets 105, 106 of components with each set including a portion of single mode fiber 108, a first amplifier 109, a dispersion compensating module 110 and a second amplifier 111. The dispersion compensating module may comprise a section of dispersion compensating fiber, or some other means of dispersion compensation. A further amplifier comprising a de-multiplexer preamplifier 115 is also provided.

The strategy is to place one or more sequences of these components—a Single Mode Fiber (SMF), an Amplifier (Amp), a Dispersion Compensating Module (DCM), an Amplifier (Amp)—between the Multiplexer (MUX) 102 and the De-Multiplexer (DeMUX) 103. The user is assumed to be able to specify the length and other parameters of each span of SMF e.g., 108. The Multiplexer input is connected to a Transmitter and the De-Multiplexer output is connected to a receiver.

The relevant input data can include necessary link and technology specifications including details on catalogue parts. Preferably, the system is able to generate all the signals propagated in the link and other relevant information including the location of each amplifier, its gain, the signal to noise ratio (SNR) and the transmitter power for each optical channel of the optical link.

Figure 2:
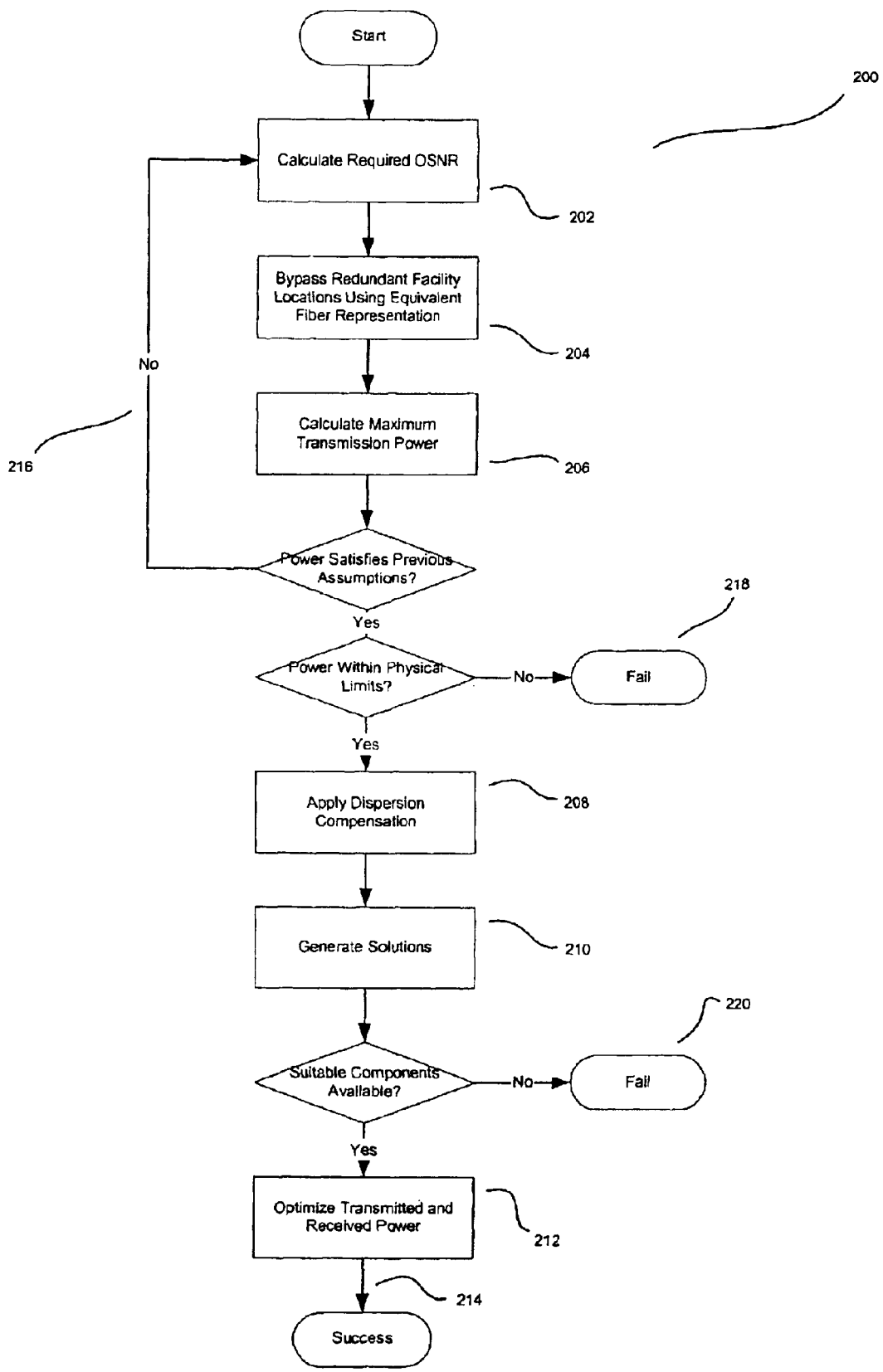
FIG. 2 illustrates a flow chart of the steps in the preferred embodiment.

Turning now to FIG. 2, there is illustrated a flow chart 200 of the steps of the preferred embodiment. The first step 202 is to calculate the required optical signal to noise ratio (OSNR) at the output of the link. An optimisation procedure is then used to bypass redundant facility locations by representing sections of the link using equivalent fibers 204. Next, the maximum acceptable transmission power is calculated 206. This power is checked against assumptions made previously in the process, and if these assumptions are found to be invalid the process can perform further iterations 216 using the revised value of maximum power. If the required power cannot be achieved with, e.g., the physical constraints of available devices, then the synthesis fails at this point 218. Next, the dispersion compensation components are added 28 and parameters calculated for those components. Next, a set of solutions is generating using available components to replace generic components placed in the previous steps of the algorithm 210. If no solution is found using available components, the synthesis fails at this point 220. The transmitted and received powers are then optimized 212 using transmitter pre-emphasis, and an optional receiver preamplifier, so as to produce output 214. Each of the steps 202–212 is described in more detail below.

The desired output of the algorithm is the generation of all the signals propagated in the link and other relevant information such as the location of each amplifier, the gain of each amplifier, SNR and the transmitter power for each optical channel of the optical link.

1 Method for Calculation of Equivalent Fiber Representations (21 of FIG. 2)

An essential requirement of the Optical Multiplex Section synthesis technique of the present invention is the ability to reduce multiple concatenated actual optical fiber spans to a single effective fiber span, or equivalent fiber representation. Methods for performing this reduction are described in the following subsections.

1.1 First Algorithm

Figure 3:
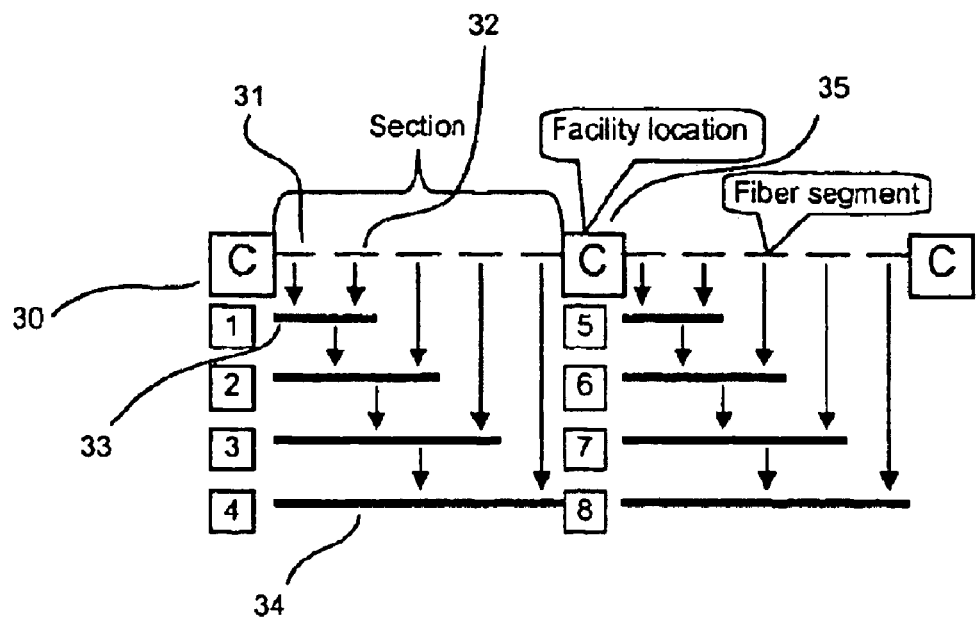
FIG. 3 illustrates the process of joining fiber segments.

As a first step, the following algorithm is implemented to calculate the parameters of the "effective fiber" between Facility locations. This algorithm is illustrated by way of example with reference to FIG. 3, which illustrates a series of fiber segments e.g. 31, 32 between facilities e.g., 30, 35. The algorithm can consist of the following steps:

1. Start from the leftmost Facility location 30.
2. Start from the left Facility location 30.
3. Take the left-most two fiber segments e.g. 31, 32.
4. Make a new fiber segment 33 by adding the lengths of the two fiber segments.
5. Calculate the left-hand side variables in accordance with the definitions and equations outlined below.
6. Use the new fiber segment 33 as the left-most fiber segment.
7. Go to Step 3 until the length of the resulting fiber 34 reaches the next Facility 35 location.
8. Make this Facility 35 the left-most Facility location.
9. Go to Step 2 until there are no more Facility locations left.
10. Verify the correctness of the results of steps 1 to 9 of the algorithm for each section with the formulas as set out in Section.

The following symbols are used to represent the actual and effective fiber sections.

1.2 Alternative Algorithm

| Symbol | Description |
|---|---|
| $fiber_i$ | $i^{th}$ fiber |
| $fiber_{i-1}$ | $(i+1)^{th}$ fiber |
| $fiber_{eff,i}$ | Effective fiber made using $fiber_i$ and $fiber_{i+1}$ |

Wherein each actual fiber has the following parameters.

| Symbol | Description |
|---|---|
| l | Length |
| $A_{eff}$ | Effective cross-section area |
| D | Dispersion coefficient |
| DS | Dispersion-slope coefficient |
| $D_{PMD}$ | PMD coefficient |
| $\alpha$ | loss coefficient |
| $\alpha_P$ | loss coefficient for Raman pump band |
| $\alpha_{PDL}$ | PDL coefficient |
| $\gamma$ | non-linear coefficient |
| $n_2$ | non-linear Kerr coefficient |
| $g_{Raman}$ | Raman gain slope |

The parameters of the effective fiber, $fiber_{eff,i}$, obtained by concatenating the two fiber segments $fiber_{eff,i-1}$ and $fiber_i$ can be calculated according to the following formulae:

$$fiber_{eff,i}.l = fiber_i.l + fiber_{eff,i-1}.l$$

$$fiber_{eff,i}.A_{eff} = \left(\frac{fiber_i.A_{eff} \cdot fiber_i.l + fiber_{eff,i-1}.A_{eff} \cdot fiber_{eff,i-1}.l}{fiber_i.l + fiber_{eff,i-1}.l}\right)$$

$$fiber_{eff,i}.D = \left(\frac{fiber_i.D \cdot fiber_i.l + fiber_{eff,i-1}.D \cdot fiber_{eff,i-1}.l}{fiber_i.l + fiber_{eff,i-1}.l}\right)$$

$$fiber_{eff,i}.DS = \left(\frac{fiber_i.DS \cdot fiber_i.l + fiber_{eff,i-1}.DS \cdot fiber_{eff,i-1}.l}{fiber_i.l + fiber_{eff,i-1}.l}\right)$$

$$fiber_{eff,i}.D_{PMD} = \sqrt{\frac{(fiber_i.D_{PMD})^2 \cdot fiber_i.l + (fiber_{eff,i-1}.D_{PMD})^2 \cdot fiber_{eff,i-1}.l}{fiber_i.l + fiber_{eff,i-1}.l}}$$

$$fiber_{eff,i}.\alpha = \left(\frac{fiber_i.\alpha \cdot fiber_i.l + fiber_{eff,i-1}.\alpha \cdot fiber_{eff,i-1}.l + \ln(SpliceLoss)}{fiber_i.l + fiber_{eff,i-1}.l}\right)$$

$$fiber_{eff,i}.\alpha_P = \left(\frac{fiber_i.\alpha_P \cdot fiber_i.l + fiber_{eff,i-1}.\alpha_P \cdot fiber_{eff,i-1}.l + \ln(SpliceLoss)}{fiber_i.l + fiber_{eff,i-1}.l}\right)$$

$$fiber_{eff,i}.\gamma = \left(\frac{fiber_{eff,i}.\alpha}{1 - \exp(-fiber_{eff,i}.\alpha \cdot fiber_{eff,i}.l)}\right) \times$$

$$\left(fiber_i.\gamma \cdot \left(\frac{1 - \exp(-fiber_i.\alpha \cdot fiber_i.l)}{fiber_i.\alpha}\right) + fiber_{eff,i-1}.\gamma \cdot \exp(-fiber_i.\alpha \cdot fiber_i.l) \cdot \left(\frac{1 - \exp(-fiber_{eff,i-1}.\alpha \cdot fiber_{eff,i-1}.l)}{fiber_{eff,i-1}.\alpha}\right)\right)$$

$$fiber_{eff,i}.n_2 = \left(\frac{fiber_{eff,i}.\gamma \cdot c \cdot fiber_{eff,i}.A_{eff}}{2\pi \cdot f_c}\right)$$

$$fiber_{eff,i}.g_{Raman} = \frac{fiber_{eff,i}.\alpha_P \cdot fiber_{eff,i}.A_{eff}}{(1 - \exp(-fiber_{eff,i}.\alpha_P \cdot fiber_{eff,i}.l))} \times$$

$$\left\{\left(\frac{1 - \exp(-fiber_i.\alpha_P \cdot fiber_i.l)}{fiber_i.\alpha_P \cdot fiber_i.A_{eff}}\right) \cdot \exp(-fiber_{eff,i-1}.\alpha_P \cdot fiber_{eff,i-1}.l) \cdot fiber_i.g_{Raman} + \left(\frac{1 - \exp(-fiber_{eff,i-1}.\alpha_P \cdot fiber_{eff,i-1}.l)}{fiber_{eff,i-1}.\alpha_P \cdot fiber_{eff,i-1}.A_{eff}}\right) fiber_{eff,i-1}.g_{Raman}\right\}$$

$$fiber_{eff,i}.P_{out-max} = \min(fiber_i.P_{out-max}, fiber_{eff,i-1}.P_{out-max})$$

The first algorithm described in the previous section generates the parameters of the effective fiber by successively concatenating the effective fiber representation with additional actual fiber segments, The advantage of this approach in a specific embodiment is that a single function that concatenates two segments can be implemented, and then used whenever concatenation of two or more actual fiber segments is required. This avoids duplication of functionality within the implementation, which is a possible source of error or inconsistency. However, the successive concatenation method is mathematically equivalent to an alternative approach, in which the effective fiber representation is calculated from all segments via a set of monolithic computations. This alternative approach is described in this section.

The following symbols are now used to represent the actual fiber sections, and the overall effective fiber

| Symbol | Description |
|---|---|
| $fiber_i$ | $i^{th}$ fiber from left |
| N | Total number of fiber segments |
| $fiber_{eff}$ | Effective fiber made using N fibers |

Wherein each actual fiber again has the following parameters.

| Symbol | Description |
|---|---|
| l | Length |
| $A_{eff}$ | Effective cross-section area |
| D | Dispersion coefficient |
| DS | Dispersion-slope coefficient |
| $D_{PMD}$ | PMD coefficient |
| $\alpha$ | loss coefficient |
| $\alpha_P$ | loss coefficient for Raman pump band |
| $\alpha_{PDL}$ | PDL coefficient |
| $\gamma$ | non-linear coefficient |
| $n_2$ | non-linear Kerr coefficient |
| $g_{Raman}$ | Raman gain slope |

Suppose the above fibers are connected serially to form the following effective fiber:

| Symbol | Type Name | Description |
|---|---|---|
| $fiber_{eff}$ | Fiber | Effective fiber made using $fiber_1 \ldots fiber_N$ |

Then the parameters of the effective fiber can be calculated directly using the following formulae:

$$fiber_{eff}.l = \sum_{i=1}^{N} fiber_i.l$$

$$fiber_{eff}.A_{eff} = \left( \frac{\sum_{i=1}^{N} fiber_i.A_{eff} \cdot fiber_i.l}{\sum_{i=1}^{N} fiber_i.l} \right)$$

$$fiber_{eff}.D = \left( \frac{\sum_{i=1}^{N} fiber_i.D \cdot fiber_i.l}{\sum_{i=1}^{N} fiber_i.l} \right)$$

$$fiber_{eff}.DS = \left( \frac{\sum_{i=1}^{N} fiber_i.DS \cdot fiber_i.l}{\sum_{i=1}^{N} fiber_i.l} \right)$$

$$fiber_{eff}.D_{PMD} = \sqrt{\left( \frac{\sum_{i=1}^{N} (fiber_i.D_{PMD})^2 \cdot fiber_i.l}{\sum_{i=1}^{N} fiber_i.l} \right)}$$

$$fiber_{eff}.\alpha = \left( \frac{\left(\sum_{i=1}^{N} fiber_i.\alpha \cdot fiber_i.l\right) + (N-1) \cdot \ln(SpliceLoss)}{\sum_{i=1}^{N} fiber_i.l} \right)$$

$$fiber_{eff}.\alpha_P = \left( \frac{\sum_{i=1}^{N} fiber_i.\alpha_P \cdot fiber_i.l + \ln(SpliceLoss)}{\sum_{i=1}^{N} fiber_i.l} \right)$$

-continued $$fiber_{eff}.\gamma = \left(\frac{fiber_{eff}.\alpha}{1-\exp(-fiber_{eff}.\alpha \cdot fiber_{eff}.l)}\right) \times$$

$$\left(\sum_{i=1}^{N}\left(fiber_i.\gamma \cdot \exp\left(-\sum_{j=1}^{i-1} fiber_j.\alpha \cdot fiber_j.l\right) \cdot \left(\frac{1-\exp(-fiber_i.\alpha \cdot fiber_i.l)}{fiber_i.\alpha}\right)\right)\right)$$

$$fiber_{eff}.n_2 = \left(\frac{fiber_{eff}.\gamma \cdot c \cdot fiber_{eff}.A_{eff}}{2\pi \cdot f_c}\right)$$

$$fiber_{eff}.g_{Raman} = \frac{fiber_{eff}.\alpha_P \cdot fiber_{eff}.A_{eff}}{(1-\exp(-fiber_{eff}.\alpha_P \cdot fiber_{eff}.l))} \times$$

$$\left(\sum_{i=1}^{N}\left(\left(\frac{1-\exp(-fiber_i.\alpha_P \cdot fiber_i.l)}{fiber_i.\alpha_P \cdot fiber_i.A_{eff}}\right) \cdot \exp\left(-\sum_{j=i+1}^{N} fiber_j.\alpha_P \cdot fiber_j.l\right) \cdot fiber_i.g_{Raman}\right)\right)$$

$$fiber_{eff}.P_{out-max} = \min(fiber_1.P_{out-max}, \ldots, fiber_N.P_{out-max})$$

2 Link Synthesis Method

The preferred objective is to synthesize a WDM Optical Multiplex Section that satisfies a predetermined required performance objective. In this example, the objective is that, for all channels transmitted in the link, the probability of a bit being received in error is less than some user-specified bit-error rate, BER. A number of steps are used to achieve this objective, as described in the following subsections.

2.1 Calculate required OSNR (202 of FIG. 2)

(a) Calculate Q for Given BER

The first step in the synthesis process is to convert the user-specified BER into an equivalent performance metric known as the Q-factor, or simply Q, which is better suited for use in the subsequent calculations. The Q is computed from the BER using the following equation:

$$BER = \frac{1}{\sqrt{2\pi}\,Q}\exp\left(-\frac{Q^2}{2}\right)$$

Note that Q is higher for a channel with better performance (i.e. lower BER).

(b) Adjust Q to Account for Four-Wave Mixing (FWM) Penalty

When multiple WDM channels are transmitted at high power levels through a single optical fiber, a nonlinear process known as four-wave mixing (FWM) results in crosstalk between the channels. This causes a penalty at the receiver, whereby the BER will be higher than that predicted if the effect of FWM is not taken into account. In order to ensure that this penalty does not result in a failure to meet the BER objective, the value of Q found in the previous step is preferably adjusted upwards to provide a margin for the FWM penalty.

The adjusted value of Q is determined using the following set of procedures.

An initial procedure is used to define the system properties:

1. Consider M spans of fiber with the following properties:
   $\gamma j$=Nonlinear index of $j^{th}$ fiber span in units of $W^{-1}\,m^{-1}$
   Dj=Dispersion of $j^{th}$ fiber span in units of $s\,m^{-2}$
2. Consider N optical signals, with equal power, equally spaced on a frequency grid, with the following properties:
   $\lambda$=Center wavelength
   $\Delta f$=Frequency spacing of channels
   Pj =Power at start of each fibre section 3. For the system, compute:

$$\sigma_1 = 1.4 \times (1 - 1.7 N^{-0.75})$$

4. For each section of fiber compute:

$$k_j = \frac{P_j \gamma c}{\pi \lambda^2 |D_j| \Delta f^2}$$

$$F_j(p) = -\frac{2}{k_j^2 \sigma_1^2 + 2}$$

5. For the entire span compute:

$$F(p) = \prod_j F_j(p)$$

$$f(S) = \mathfrak{I}^{-1}\{F(p)\}$$

where $\mathfrak{I}^{-1}$ represents the Inverse Fourier Transform and $f(S)$ is the probability density function (PDF) of the parameter S.

6. Define p to be the ratio of noise during marks and spaces for the undistorted system, $\rho = \sigma_{mark,0}/\sigma_{space,0}$. $\rho$ typically takes on a value of approximately 2.

7. Define $erfc(Q) = \frac{1}{\sqrt{\pi}} \int_{Q/\sqrt{2}}^{\infty} e^{-\frac{t^2}{2}} dt$ Then the following procedure defines a function $Q_{avg}$= FWMQpenalty($Q_0$):

1. Given a Q value for the undistorted system (without FWM considered), $Q_0$, a BER value can be calculated as follows taking FWM into account:

$$BER(S, \rho, Q_0) = \frac{1}{2}\left[erfc\left(Q_0 \times \frac{(1-S)(\rho+1)-1}{\sqrt{1+(\rho^2-1)(1-S)}}\right) + erfc(Q_0)\right]$$

2. The average BER for the system with FWM considered is computed, weighted by the PDF of S, $f(S)$.

$$BER_{avg} = \int BER(S, \rho, Q_0) f(S) dS$$

3. An average Q value is computed by solving the following equation for $Q_{avg}$:

$$BER_{avg} = erfc(Q_{avg}).$$

A solution to the equation $Q_{desired} = FWMQpenalty(Q_0)$ is required for $Q_0 \in [4,12]$ using a specified desired value of Q=Qdesired, being equal to the initial Q-factor determined from the user-specified BER. The adjusted value $Q_0$, if it exists, will be greater than the target $Q_{desired}$, thus providing a margin that will allow for the degradation in Q-factor due to FWM. The required solution is obtained using the following procedure:

1. The function FMWQpenalty is evaluated at values $Q_0=4$ and $Q_0=12$, $$Q_{test,1} = FMWQpenalty(4)$$

$$Q_{test,2} = FWMQpenalty(12)$$

2. If the desired value does not satisfy $Q_{test,1} < Q_{desired} < Q_{test,2}$, then no solution can be obtained for the specified fibre and signal parameters. A lower value of k is needed to obtain the desired Q value. Since k is proportional to the signal power level, a solution may be obtained if it is acceptable to the user to use a lower power level P for all channels.

3. Otherwise, if the desired value does satisfy $Q_{test,1} < Q_{desired} < Q_{test,2}$, then a solution for $Q_0$ is found in this range using the Newton-Raphson numerical rootfinding method.

The resulting value of $Q_0$ is the FWM-adjusted Q value that is used in the following steps of the link synthesis procedure.

(c) Calculate Required OSNR at Receiver

The optical signal-to-noise ratio (OSNR) is the ratio of the optical signal power to the accumulated optical noise (added in optical amplifiers) within the optical bandwidth of a signal channel, as measured at the receiver. The required OSNR at the receiver is determined from the adjusted Q value obtained at the previous step by solving the following equation:

$$Q \approx \frac{2 \times OSNR \times (\sqrt{\alpha})}{\sqrt{\left(1-\frac{1}{2\alpha}\right)} + \sqrt{\left(1-\frac{1}{2\alpha}\right) + 4 \times OSNR}}$$

where $\alpha$ is a user-specified parameter representing the ratio of the optical bandwidth of each signal channel to the bit-rate of the data carried on the channel.

There are a number of additional processes and factors that can further degrade the quality of the signal at the receiver. Each of these effects can be accounted for empirically by assignment of an effective OSNR margin. The complete set of margins constitutes a heuristic method to include all sources of degradation. The margins are preferably specified via a corresponding set of user-supplied variables such as those listed in the following table.

| Variable Name | Description |
| --- | --- |
| heuTxChirpMargin | Margin to account for excess bandwidth of the transmitter compared with a chirpless modulator |
| heuTxElecMargin | Margin to account for imperfect (i.e. not flat amplitude, not linear phase) response of the transmitter drive circuitry and laser parasitics |
| heuRxElecMargin | Margin to account for imperfect amplitude and phase response of the electrical receiver |
| heuRxSenTiltMargin | Margin to account for signal reduction in wavelength-dependence of receiver |
| heuTxAgeMargin | Margin to account for transmitter aging |
| heuRxAgeMargin | Margin to account for receiver aging |
| heuMuxBwPhMargin | Margin to account for imperfect (not flat) amplitude and phase (non-linear) response of optical multiplexer on desired channel |
| heuMuxPolMargin | Margin to account for polarization dependence of multiplexer |
| heuMuxAgeMargin | Margin to account for degradation of multiplexer response due to aging |
| heuMuxXtalkMargin | Margin to account for crosstalk from adjacent channels in an imperfect multiplexer |
| heuDeMuxBwPhMargin | Margin to account for imperfect (not flat) amplitude and phase (non-linear) response of optical de-multiplexer on desired channel |
| heuDeMuxPolMargin | Margin to account for polarization dependence of de-multiplexer |
| heuDeMuxAgeMargin | Margin to account for degradation of de-multiplexer response due to aging |
| heuDeMuxXtalkMargin | Margin to account for crosstalk from adjacent channels in an imperfect de-multiplexer |
| heuFiberRepairMargin | Margin to account for loss due to repairs of fiber in the optical link |
| heuFiberAgeMargin | Margin to account for increase of fiber loss due to aging |
| heuMonitorMargin | Margin to account for power loss due to performance monitoring |
| heuDispMargin | Margin to account for linear dispersion in the whole fiber plant |
| heuDispCompMargin | Margin to account for signal degradation caused by dispersion-compensating equipment with imperfect characteristics |
| heuSPMMargin | Margin to account for SPM induced effects |
| heuRamanMargin | Margin to account for power transfer between channels by Raman Scattering in the WDM system |
| heuBrillouinMargin | Margin to account for power loss by Brillouin scattering in the WDM system |
| heuPMDMargin | Margin to account for PMD |
| heuPMLMargin | Margin to account for PML |
| heuAmpGTiltMargin | Margin to account for signal reduction in worst channels due to gain tilt |
| heuAmpPolGMargin | Margin to account for polarization dependent gain of amplifiers |
| heuAmpPolHoleMargin | Margin to account for polarization hole burning in amplifiers |
| heuAmpAgeMargin | Margin to account for gain reduction in amplifiers due to aging |
| heuFECBERGain | BER improvement due to Forward Error Correction (FEC) |

An adjusted OSNR, $OSNR_{adj}$, can then be calculated from the unadjusted OSNR using the following formulae:

$$FECSNRGain = 2 \times \ln(heuFECBERGain)$$

$$SNRMargin = heuTxChirpMargin \times$$

$$heuTxElecMargin \times$$

$$heuRxElecMargin \times$$

$$heuRxSenTiltMargin \times$$

$$heuTxAgeMargin \times$$

$$heuRxAgeMargin \times$$

-continued heuMuxBwPhMargin× heuMuxPolMargin× heuMuxAgeMargin× heuMuxXtalkMargin× heuDeMuxBwPhMargin×
heuDeMuxPolMargin× heuDeMuxAgeMargin× heuDeMuxXtalkMargin× heuFiberRepairMargin× heuFiberAgeMargin× heuMonitorMargin× heuDispMargin× heuDispCompMargin× heuSPMMargin× heuRamanMargin× heuBrillouinMargin× heuPMDMargin× heuPMLMargin× heuAmpGTiltMargin× heuAmpPolGMargin× heuAmpPolHoleMargin× heuAmpAgeMargin/

FECSNRGain $$OSNR_{adj} = OSNR_x SNRMargin$$

2.2 Bypass Redundant Facility Locations Using Equivalent Fiber Representation (204 of FIG. 2)

Next an optimization algorithm is used to bypass redundant facility locations. The object of the optimization is to eliminate the largest number of facility locations that can be found, that are unnecessary in order to meet the link design objectives. Advantageously, each facility location that can be eliminated in this way represents a saving in equipment and maintenance expenses that substantially reduces the installation and operating costs of the link.

(a) Constraints

A facility location can be eliminated if, after concatenating the fiber sections adjacent to the facility, a number of constraints are satisfied. These constraints can be expressed as follows.

First, a number of fixed design constraints and objectives must be considered.

there is a maximum gain $G_{max}$ achievable by any optical amplifier that can be placed at a facility location, and thus the total loss between any two facility locations must not exceed this value;

the user may wish to limit the maximum dispersion to some fraction of the theoretical dispersion length, which can be achieved by setting a heuristic "dispersion length contraction factor" represented by a variable heuKi;

the user may wish to limit the absolute maximum span length, which can be achieved by setting a heuristic control represented by a variable heuMaxSpanLength;

there is a maximum acceptable level of total optical noise that can be contributed by all amplifiers combined as determined by the required OSNR, which can be achieved by constraining the total gain in the link to a fixed maximum that depends upon the noise figure NF of the optical amplifiers, and that is represented by a variable MaxTotalGain;

there is a target total link capacity (in bits per second), represented by a variable linkCapacity, which it is the objective of the design process to achieve;

there is a technology limit on the spacing between adjacent wavelength channels, represented by a variable techChannelSpacing.

Next, it is a requirement that the variation in loss (or, equivalently, in the compensating gain required) for each segment is minimum, as well as minimizing the total number of segments (which is assumed to be an overall objective). In other words, it is required to find a particular configuration in which the lengths of all segments are as uniformly distributed as possible. Advantageously, a design that meets these requirements will be easier to deploy and to maintain.

The above requirements can be expressed mathematically, in a form suitable for implementation in the preferred embodiment as described in the following section. The facility bypass algorithm constructs sets of concatenated fiber segments that can be expressed using the following equivalent set equation:

$$\psi_i = [n_{1i}, n_{1i}+1, n_{1i}+2, \ldots, n_{mi}] \text{ with } 1 \leq m \leq N, 1 \leq i \leq N, \text{ and}$$
$n_{1i} \in [1,N]$ are consecutive integers for a given $\psi_i$. These sets have the property that:

$$\psi_i \bigcap_{\forall i \neq j} \psi_j = \emptyset \text{ and } \bigcup_i \psi_i = [1, 2, \ldots, N],$$

i.e. all the fiber segments from the previous phase are used, and the set is ordered in the sense that if $i \leq j$ then $\psi_i \leq \psi_j; \psi_i \neq \emptyset, \psi_j \neq \emptyset$ where relational operators are operated pair-wise between the sets. The fixed design constraints and objectives described previously can then be expressed in the form:

$$G_i \leq G_{max}$$

where $$G_i = \exp\left(\sum_{j \in \psi_i} \bar{a}_j \bar{l}_j\right)$$

is the gain required to compensate for the loss in the $i^{th}$ concatenated segment, that is provided by the line amplifiers at the end of each segment, e.g. 109 of FIG. 1.

$$\sum_{j \in \psi_i} \bar{l}_j \leq heuKi \times \bar{l}_{UB\psi_i}$$

$$\sum_{j \in \psi_i} \bar{l}_j \leq heuMaxSpanLength$$

$$\prod_i G_i \leq MaxTotalGain$$

while the minimization in variation of lengths can be achieved by minimizing the following quantity:

$$V = \sqrt{\left(\sum_{i=1}^{\aleph}\left(L_{\psi_i} - \sum_{i=1}^{\aleph} L_{\psi_i}/\aleph\right)^2\right)/\aleph}$$

In the above expressions, the following definitions of symbols hold:

$L_{\psi_i}$ is the total loss of the fiber segment in section $\psi_i$;

$\aleph$ is the number of sections;

$l_{UB_{\psi_i}} = \sqrt{l_{D_{\psi_i}} \times l_{NL_{\psi_i}}}$ is the length upper bound;

$l_{NL_{\psi_i}} = \frac{1}{\gamma_{\psi_i} \overline{P}_{\psi_i}^{thresh}}\left(\frac{linkCapacity}{2*techChannelSpacing}\right)$ is the "nonlinear length";

$l_{D_{\psi_i}} = \frac{2\pi c \times heuTo^2}{\lambda_{ref}^2 |\overline{D}_{\psi_i}|}$ is the dispersion length;

The parameter $\overline{P}_{104\ i}^{thresh}$ that appears in the expression for the nonlinear length is the maximum optical power that must be handled by the link, which in the preferred embodiment is set to the value of $P_{out-max}$ determined in the equivalent fiber representation calculation. The parameter heuTo that appears in the expression for the dispersion length is a heuristic parameter that represents an equivalent pulse width (full width half maximum) for the transmitted data bits. This parameter is determined according to the characteristics of the transmitter(s).

(b) Divide Link into Independent Blocks

Figure 4:
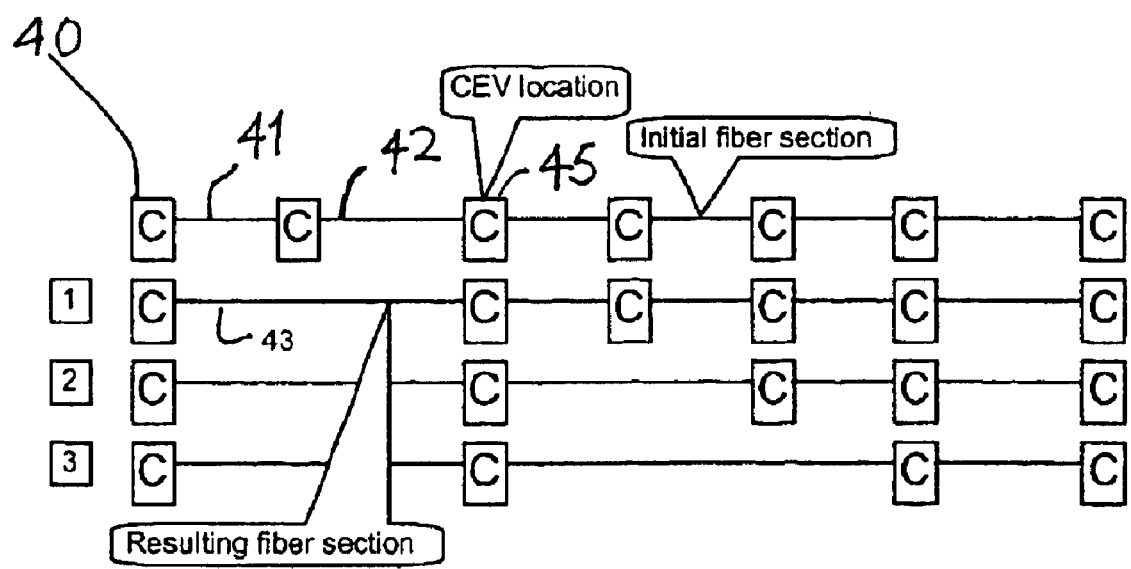
FIG. 4 illustrates the process of bypassing facility locations.

FIG. 4 illustrates a link comprising a series of fiber segments e.g. 41, 42 located between facilities e.g. 40, 45. The first step in the redundant facility elimination algorithm is to divide the link into independent sub-links. A pair of independent sub-links can be identified as follows:

1. Starting from the left-most two adjacent fiber sections e.g. 41, 42.
2. Determine the total loss of the effective fiber obtained by concatenating the two sections.
3. If the total loss thus obtained exceeds the maximum gain $G_{max}$ that can be achieved at a single facility location, then it will clearly be impossible for any single concatenated section to contain the two original fiber sections. In this case, the facility location between the two fiber section will be required, and it is possible to consider the two sub-links comprising all sections to the left of the facility location, and all sections to the right of the facility location, independently.
4. If the right-hand end of the link has not been reached, return to step 2, considering the concatenation of the second fiber section from this step, e.g. 42, with the next adjacent section to its right.

(c) Eliminate Redundant Facility Locations

Redundant facility locations are eliminated on each sub-link according to the following algorithm, again with reference to FIG. 4:

1. Start from the left-most facility location e.g. 40.
2. Take the left-most two fiber sections e.g. 41, 42.
3. Make a new fiber section e.g. 43 by concatenating the two fiber sections.
4. If the properties of the new fiber section 43 satisfy the constraints set out in (a) above, then make this new fiber section the left-most fiber section and go to step 2.
5. Take the next left-most facility location 45 and go to step 2.

2.3 Calculate Maximum Transmission Power Allowing for Nonlinear Effects (206 of FIG. 2)

(a) Calculate Maximum Allowed Transmission Power per Channel at Transmitter Considering FWM and ASE In this step, it is necessary to verify that the design synthesized by the previous steps is viable. The combination of FWM and optical noise added by the amplifiers places an upper limit on the power in the link, above which the assumptions made previously regarding the impact of non-linearities are invalid. This upper limit $P_{FWM}$ can be calculated as follows:

$$P_{FWM} = \sqrt{1.5hvB_0NF\left(\sum_{i=1}^{N} G_i\right)\sqrt{\frac{SNR}{\Im\sum_{i=1}^{N}\frac{k_i^2 l_i^2}{G_i}}}}$$

where h=6.626176 $\times 10^{-34}$Js c=299792458 m/s

NF is the noise figure set for the generic variable power amplifiers

SNR is the required signal to noise ratio of the link $\{l_i : i \in [1,N]\}$ is the length of fibers in the fiber-plan $\{G_i : i \in [1,N]\}$ is the gain of the amplifiers for compensating losses $$k_i = \frac{\gamma_i c}{2\pi(\overline{D}_i l_i)\lambda^2 \Delta f^2}$$

$\overline{D}_i$ is the mean dispersion seen by the channel in the $i^{th}$ link $\lambda$ is the mean operating wavelength: normally 1550 nm $\Delta f$ is the minimum channel spacing of the link $\gamma I$ is the nonlinear coefficient of the $i^{th}$ fiber $$\Im = \max_{n \in [1,M]} \sum_{\substack{n=p+q-r \\ n, r \neq p, q \\ r, p, q \in [1,M]}} \frac{1}{16(n-p)^2(n-q)^2} \approx$$

$$0.4 \times \left(1 - \frac{1}{M}\right) - \frac{0.46}{\sqrt{M}} \times \exp\left(-\frac{M}{10}\right)$$

M is the number of channels $B_0 = 0.7 \times \alpha \times$ avgBitRate

The parameter avgBitRate is the average of the individual transmitter bit-rates set out in the link specification provided by the user.

If the calculated maximum allowed power $P_{FWM}$ exceeds the power launched into any fiber section (the maximum of which is given by $P_{out-max}$), then it is possible to go back and repeat the synthesis process using the value of $P_{FWM}$ as the maximum allowed launch power.

(b) Calculate Maximum Allowed Transmission Power per Channel at Transmitter Considering SRS and ASE The nonlinear process of Stimulated Raman Scattering (SRS) can also result in an unacceptable degradation of signal quality at the receiver, if the maximum power launched into any fiber segment exceeds a threshold power $P_{SRS}$. SRS was not included in the synthesis process, on the assumption that this threshold power level is not exceeded.

It is desirable to verify this assumption. The SRS threshold power can be calculated using the following equation:

$$P_{SRS} = \sqrt{\frac{\left(1.5 SNR \times \chi \times h\nu B_0 NF\left(\sum_{i=1}^{N} G_i\right)\right)}{\frac{1}{4} M(M-1)\Delta f\left(\sum_{i=1}^{N} \left(\frac{g_{Raman}}{A_{eff}}\right)_i \frac{l_i}{\ln(G_i)}\left(1-\frac{1}{G_i}\right)\right)}}$$

where:

$\chi$ is a user-specified parameter defining the acceptable SRS crosstalk level (typically 1 dB), and all other parameters have been defined previously.

If the calculated maximum allowed power $P_{SRS}$ exceeds the power launched into any fiber section (the maximum of which is given by $P_{out-max}$), then it is possible to go back and repeat the synthesis process using the value of $P_{SRS}$ as the maximum allowed launch power.

(c) Verify that Per-Channel-Output-Power is Valid

The output power at each transmitter is set according to:

$$P_{set} = \min(P_{FWM}, P_{SRS}, P_{Tx-max})$$

where $P_{Tx-max}$ is the maximum output power that all transmitters are capable of generating.

This output power setting is then validated against the target SNR, $OSNR_{adj}$, by verifying that the following relation holds:

$$\frac{P_{set}}{1.5 h\nu B_0 NF\left(\sum_i G_i\right)} \geq OSNR_{adj}$$

The factor of 1.5 in the denominator accounts for the additional noise introduced when dispersion compensation, and associated amplifiers, are added to the design in the next step.

If this relation does not hold, then the available output power from the user-specified transmitters is not sufficient to achieve the design objectives, and the synthesis has failed.

2.4 Apply Dispersion Compensation (208 of FIG. 2)

(a) Determine Residual Dispersion

When high power signals are launched into an optical fiber, the nonlinear process of self-phase modulation (SPM) causes spectral distortion of the signals. Under these conditions, signal quality at the receiver can generally be improved by under-compensating for dispersion, and thus allowing a residual dispersion to exist over the link. The optimum amount of residual dispersion can be calculated using the following procedure.

1. The SPM limited per-channel power-distance product is determined for a given set of equipment. In general it can be difficult to obtain this value by analytical means, and therefore a physical layer simulation software tool such as VPItransmissionMaker™ WDM available from VPIsystems Inc may be used. This value can be denoted by the name PowXDistProd.

2. The residual dispersion value at the receiver can then be optimised by finding the residual dispersion for which the Q value at the receiver is minimum. Again, if no more efficient means is available, a physical layer simulation software tool such as VPItransmission-Maker™ WDM may be used. This value can be denoted by the name ResDispVal.

3. The residual dispersion $\delta DL_i$ at the end of each individual fiber span i of length $l_i$ given the input power P per channel is then determined using the following formula:

$$\delta DL_i = -\left(\frac{ResDispVal \times l_i \times P}{UPerImFactor \times PowXDistProd}\right)$$

where UPerImFactor is a user-supplied estimated performance improvement factor due to under-compensation, which typically assumes a value around 2.

(b) Apply Dispersion Compensation by Selection from Available Dispersion Compensating Modules Compensation for dispersion in each fiber span is provided by dispersion compensating modules (DCM) installed at the end of the span, e.g. 110 of FIG. 1. The amount of dispersion compensation (DL)comp,J required after span i to achieve the target residual dispersion $\delta DL_i$ is calculated according to:

$$(DL_{comp,i}) = -D_i l_i + \delta DL_i$$

The objective is to select a dispersion compensating solution from a user-supplied library of available DCM components, each of which is characterized by at least its total dispersion value DC, and its loss $L_{DC}$. The first DCM in the library satisfying the following two criteria is selected:

sgn(DC)=−sgn($D_i$) i.e. the DCM must have opposite dispersion to the fiber span; and $|DC - D_i l_i| \leq \epsilon$ where $\epsilon$ is a user-specified fitting tolerance that defines how accurately the actual residual dispersion must approximate the target residual dispersion.

If there is no single DCM that satisfies the two criteria above, then an attempt may be made to attain the required compensation by combining DCMs with smaller total dispersion than required. If this fails, then a generic DCM may be assumed with the desired value, and with a loss $L_{DC}$ equal to 75% of the total loss of the preceding fiber span. The properties of the generic DCM approximate the typical properties of dispersion compensating fiber (DCF), and thus the generic DCM represents a conventional dispersion compensating module constructed from a suitable length of DCF.

(c) Compensate for Loss of DCMs

The loss of each DCM is compensated by inserting amplifiers with gain $G_{DCM,i}$ equal to the loss $L_{DC,i}$ after the DCM at the end of each fiber span i, e.g. 111 of FIG. 1.

2.5 Generate Solutions (210 of FIG. 2)

(a) Fit Amplifiers to Generic Line Amplifiers

At this stage of the synthesis process, the link design is complete except that the line amplifiers e.g. 109, 111 of FIG. 1, which compensate for loss in each fiber span, e.g. 108 of FIG. 1, and for each DCM, e.g. 110 of FIG. 1, are generic units. The required gain at each amplifier is known, however a specific available component must be substituted for the generic device.

Available amplifiers are preferably selected from a user-supplied library of amplifier and attenuator components. The required gain at each generic amplifier is achieved by selecting one or more amplifier components followed by zero or more attenuator components from this library. Although the total gain is the same if the attenuator(s) are placed prior to the amplifiers, this configuration is not used because the degradation of signal-to-noise ratio will be higher in this case.

The maximum number of amplifiers or attenuators that can be cascaded in order to achieve the generic gain target may be limited to a user-defined maximum.

If no combination of components can be found in the library that satisfy the generic gain requirements, then the design objectives cannot be achieved, and the synthesis has failed.

(b) Generate Solutions According to User Criteria

When fitting library components (e.g. DCMs, amplifiers and attenuators) to generic requirements, there may be more than one component, or combination of components, that meet the requirements. In this case, multiple solutions may be generated. The user may be able to select from these solutions either manually, or automatically by specifying additional criteria for the design, assuming that suitable information is available in the component library. For example, a common requirement might be that a lowest cost solution is required. If cost information for each component is available in the library, then the lowest cost solution can easily be determined from multiple available solutions by calculating the total cost of each and retrieving the solution for which this total is a minimum.

2.6 Optimize Transmitted and Received Optical Power (212 of FIG. 2)

(a) Insert Receiver Preamplifier (if required)

For each solution, the actual received average power of every channel can now be calculated using the characteristics of the components chosen from the component libraries. Due to the wavelength-dependence of amplifier gain, and component losses, the received average power may be different for different channels.

If there is insufficient received average power at any receiver, a receiver preamplifier, 115 of FIG. 1, can be introduced to increase the received power.

If the received power at any receiver is smaller than the receiver sensitivity level, then the average power is raised using a pre-amplifier until this condition is satisfied for the worst affected channel.

If the minimum SNR value at any receiver is smaller than the required SNR value, the average power is raised using a pre-amplifier until this condition is satisfied for the minimum SNR channel.

(b) Equalize Output Power

As mentioned above, once real components are introduced it is expected that the received power will be different for each wavelength channel. Variations in powers $P_i^{out}$ at the output of the link can be compensated by adjusting the corresponding transmitted powers $P_i^{in}$ at the input to the link. This technique is known as pre-emphasis.

The following algorithm is applied to compute a suitable set of pre-emphasized inputs for M channels, assuming that the desired maximum variation in received power is represented by a user-specified variable EqPowTol.

1. Start with a set of equal initial input powers $(P_i^{in})_{old}$, and compute the corresponding output powers $(P_i^{out})_{old}$
2. Compute a measure of the mean-squared variation in received power for the "old" set of input and output powers according to:

$$\sqrt{\frac{\sum_{i=1}^{N}\left((P_i^{out})_{old} - \sum_{j=1}^{N}(P_j^{out})_{old}/M\right)^2}{M}}$$

3. If the resulting measure of variation is less than EqPowTol, then a solution has been found and the algorithm terminates.
4. Otherwise, calculate a "new" set of input powers $(p_i^{in})_{new}$ according to:

$$(P_i^{in})_{new} = \left(\sum_{j=1}^{M}(P_j^{in})_{old}\right)\left(\frac{(P_i^{in})_{old}/(P_i^{out})_{old}}{\sum_{j=1}^{M}(P_j^{in})_{old}/(P_j^{out})_{old}}\right)$$

5. If any of the resulting input powers are outside the acceptable range defined by the maximum and minimum transmitter power, and the nonlinear limits $P_{FWM}$ and $P_{SRS}$, then the power shall be set to the corresponding limiting value.
6. Compute the corresponding set of output powers $(P_i^{out})_{new}$.
7. The "new" values, now become the "old" values for the next iteration, commencing again at step 2.
8. If this process fails to achieve a solution after a user-specified maximum number of iterations, then it shall be assumed that the target EqPowTol is not achievable. (This may or may not imply a failure of the synthesis process, depending upon the criticality of attaining EqPowTol.)

The aforementioned example describes a method for implementing a system for minimizing the complexity of a predetermined optical arrangement. Obviously, depending on requirements, the method of the preferred embodiment can be readily extended to other arrangements.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

We claim:

1. A method of calculating an equivalent optical fiber representation of a multiplicity of optical fibers, the method including the step of:
   (a) successively combining parameters of a pair of adjacent optical fibers to compute parameters of a combined optical fiber that has substantially the same transmission properties as the two adjacent optical fibers; wherein one of the pair of adjacent optical fibers is a previously computed combined optical fiber.

2. A method as claimed in claim 1 wherein the step (a) further comprises the step of:(a1) progressively joining segments together between facilities and determining whether an equivalent fiber representation for the joined segments falls within first predetermined constraints.

3. A method as claimed in claim 1 where the step (a) further comprises the step of:
   (a2) progressively joining segments together across facility locations and determining whether an equivalent fiber representation for the joined segments falls within predetermined constraints.

4. A method of calculating an equivalent optical fiber representation of a multiplicity of optical fibers, the method including the step of:
   (a) combining parameters of a multiplicity of optical fibers comprising an arbitrary combination of actual fibers and equivalent fiber representations, to compute parameters of a single replacement fiber that has substantially the same transmission properties as the multiplicity of fibers.

5. A method for optimizing a topology of an optical data transmission link, the link comprising a series of optical components interconnected by optical fiber sections, the method comprising the steps of:

(a) calculating an equivalent fiber representation of the link; and (b) utilising said equivalent fiber representation to determine if any of the series of optical components can be eliminated from the link.

6. A method as claimed in claim 5 wherein said step (b) further comprises the step of:

(b1) calculating a measure of signal quality required at a receiver to satisfy a link performance criteria.

7. A method as claimed in claim 6 wherein said step (b1) comprises the step of calculating a numerical measure of signal quality corresponding to a specified link performance.

8. A method as claimed in claim 7 wherein the numerical measure of link performance is a probability of transmission errors occurring on the link.

9. A method as claimed in claim 7 wherein said numerical measure comprises a Q-factor.

10. A method as claimed in claim 6 wherein said step (b1) further includes adjusting the signal quality measure to account for additional sources of degradation in transmission.

11. A method as claimed in claim 10 wherein said additional sources include nonlinear transmission processes including four-wave mixing or stimulated Raman scattering.

12. A method as claimed in claim 6 wherein said step (b1) comprises calculating an optical signal-to-noise ratio (OSNR).

13. A method as claimed in claim 5 wherein said step (b) further comprises the step of:

(b2) calculating a maximum acceptable transmission power for said link.

14. A method as claimed in claim 13 wherein said step (b2) further comprises calculating the maximum transmission power before which unacceptable signal degradation occurs due to nonlinear transmission effects and additive noise.

15. A method as claimed in claim 14 wherein said additive noise comprises amplified spontaneous emission noise introduced in optical amplifiers.

16. A method as claimed in claim 14 wherein said additive noise comprises four wave mixing or stimulated Raman scattering.

17. A method as claimed in claim 13 further comprising the step of verifying that an output power is valid, within operating ranges of components in the link.

18. A method as claimed in claim 17 wherein said verification step includes verifying that transmitters are capable of generating the required output power.

19. A method as claimed in claim 5 wherein said step (b) further comprises:

(b3) determining suitable configuration values for predetermined components in the link.

20. A method as claimed in claim 19 wherein said configuration values include at least one of an amplification factor of an optical amplifier or a total dispersion of a dispersion compensating module.

21. A method as claimed in claim 19 further comprising the step of determining the amount of residual dispersion required to optimise signal quality at the receiver, considering an impact of nonlinear propagation effects.

22. A method as claimed in claim 21 wherein said nonlinear propagation effects include self phase modulation of each transmitted channel.

23. A method as claimed in claim 19 further comprising the step of applying dispersion compensation to achieve required residual dispersion by selecting from available dispersion compensating modules.

24. A method as claimed in claim 23 wherein said dispersion compensating modules can include lengths of dispersion compensating fiber.

25. A method as claimed in claim 23 further comprising the step of compensating for the insertion loss of the dispersion compensating modules by including further optical amplifying units in the link.

26. A method as claimed in claim 5 further comprising the step of:

(c) generating a series of components for use in the transmission link from a set of available components.

27. A method as claimed in claim 26 further comprising the step of generating multiple solutions using available devices and ranking those solutions according to an additional predetermined criteria.

28. A method as claimed in claim 27 wherein said additional predetermined criteria is a total cost of the link.

29. A method as claimed in claim 5 further comprising the step of:

(d) utilising an optimisation procedure to determine an input channel power of the optical data transmission link.

30. A method as claimed in claim 29 further including the step of determining the powers of all signal channels at the receiver, and inserting a receiver preamplifier if required to make the signals compatible with the receiver.

31. A method as claimed in claim 30 wherein said compatibility can include sufficient received power and sufficient received signal-to-noise ratio.

32. A method as claimed in claim 29 further comprising the step of optimising the pre-amplification gain and input channel power for the link.

33. A method as claimed in claim 32 further comprising the step of equalising the powers of input channels to obtain a substantially flat spectrum across the transmission bandwidth.

34. A method of optimising the componentry of an optical data transmission link, the link comprising a series of optical components interconnected by a fiber network, the method comprising the steps of:

(a) calculating an equivalent fiber representation for the link;

(b) utilising an optimisation algorithm to eliminate redundant optical components from the link;

(c) utilising an optimisation algorithm to determine the input channel power of said link.

* * * * *